(12) United States Patent
Shi et al.

(10) Patent No.: US 7,035,879 B2
(45) Date of Patent: Apr. 25, 2006

(54) SYSTEM AND METHOD FOR SYNCHRONIZING DATA OF WIRELESS DEVICES

(75) Inventors: Shepherd S. B. Shi, Austin, TX (US); Debora B. Rinkevich, Austin, TX (US); William M. Droste, Round Rock, TX (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 488 days.

(21) Appl. No.: 10/330,609

(22) Filed: Dec. 26, 2002

(65) Prior Publication Data

US 2004/0128327 A1    Jul. 1, 2004

(51) Int. Cl.
*G06F 17/30* (2006.01)

(52) U.S. Cl. ...................... 707/203; 709/248
(58) Field of Classification Search .............. 707/203; 709/248
See application file for complete search history.

(56) References Cited

U.S. PATENT DOCUMENTS

| | | | | |
|---|---|---|---|---|
| 5,613,235 A * | 3/1997 | Kivari et al. | ............... | 455/574 |
| 5,875,179 A * | 2/1999 | Tikalsky | ............... | 370/315 |
| 5,875,183 A * | 2/1999 | Nitadori | ............... | 370/328 |
| 6,240,426 B1 * | 5/2001 | Beyda et al. | ............... | 707/201 |
| 6,477,543 B1 * | 11/2002 | Huang et al. | ............... | 707/200 |
| 6,938,100 B1 * | 8/2005 | Kang | ............... | 709/248 |
| 2001/0048728 A1 * | 12/2001 | Peng | ............... | 375/354 |
| 2003/0046434 A1 * | 3/2003 | Flanagin et al. | ............... | 709/248 |
| 2003/0101329 A1 * | 5/2003 | Lahti et al. | ............... | 712/1 |

FOREIGN PATENT DOCUMENTS

EP    1 014 266 A2 *    6/2000

* cited by examiner

*Primary Examiner*—Wayne Amsbury
(74) *Attorney, Agent, or Firm*—Wei Te Chung

(57) ABSTRACT

A system for synchronizing data of wireless devices includes an application server (103), a communication tower (105), and a plurality of mobile terminals (101). Each mobile terminal includes a data type distinguishing module (305), a data filter generating module (303), and a data transferring module (307). The server includes a domain managing module (405) for executing a data filter received from any mobile terminal, and for generating a sync response. A related method includes the steps of: (a) identifying a type of data to be synchronal; (b) generating a sync request in accordance with the type of data to be synchronal, and sending the sync request to the server; (c) generating a sync response based on data stored in the server, and sending the sync response to the mobile terminal; and (d) updating data stored in the mobile terminal in accordance with the sync response.

15 Claims, 6 Drawing Sheets

SYSTEM AND METHOD FOR SYNCHRONIZING DATA OF WIRELESS DEVICES

BACKGROUND OF THE INVENTION

1. Field of the Invention

The present invention relates to a system and method for synchronizing a local data storage of a wireless device with a remote data storage of a remote server, and especially to a system and method for synchronizing according to a type of data.

2. Background of the Invention

With the development of personal electronic communications, enterprise intranets, and electronic and digitized information, many enterprises are beginning to use all kinds of mobile computing devices to assistant execution of commercial activities. Many mobile devices such as personal digital assistants (PDAs) are small and highly portable, and can update data in real time via hardwired connections or wireless communication. Users of contemporary mobile computing devices are able to connect to mail servers, web servers, on-line banking and other server-based applications located at remote data servers. Many enterprises appreciate the advantage of providing access from mobile devices to their systems or servers. These enterprises seek to extend their business into the wireless world by offering employees and customers remote access to both user interfaces and backend systems, thus providing such users with the ability to perform transactions through their mobile devices. The use of mobile devices breaks through conventional limitations of time and space, enhances the efficiency of running an enterprise, provides more information, and gives the enterprise more business opportunities. Nowadays, mobile devices are widely used in the finance, logistics, storage and distribution industries.

However, these new wireless technologies and applications have a number of problems. For example, many mobile computing devices only provide small display screens and a small memory for storing data and applications. The display screens provide only small areas for inputting of data and displaying of results data. Entry of data into the mobile device can be slow and problematic, and applications that run on the mobile device must be small. Other problems include the high cost of maintaining a wireless connection, and difficulties associated with ensuring that the mobile device has consistent, accurate and up-to-date data.

One solution to the above problems is to provide a data storage in a second computing device such as a remote data server, and to periodically synchronize data stored in the mobile device with data stored in the second computing device. U.S. Pat. No. 6,330,618 discloses a method and apparatus for synchronizing a portable computer system with a desktop computer system. In this patent, the portable computer invokes an internal first sync process, and a communication link is established between the first sync process in the portable computer and the personal computer via a hardwired network or a cable. Then the personal computer invokes a second sync process, and synchronizes data stored in the portable computer with the data in the desktop computer through the communication link.

However, this sync process relies on a hardwired network or a cable, and cannot be used in a wireless environment. Moreover, a volume of data transfer between the portable computer and the desktop computer is unnecessarily high. A good deal of unneeded data are transferred repeatedly between the portable computer and the desktop computer.

SUMMARY OF THE INVENTION

Accordingly, an objective of the present invention is to provide a system for synchronizing a local data storage of a mobile terminal with a remote data storage of a server.

Another objective of the present invention is to provide a method for synchronizing wireless devices with a server by using various sync means according to a type of data to be synchronal.

In order to achieve the first above-mentioned objective, a system for synchronizing data of wireless devices in accordance with a preferred embodiment of the present invention comprises an application server, a communication tower, and a plurality of mobile terminals. Each mobile terminal comprises: a data type distinguishing module for identifying a type of data to be synchronal; a data filter generating module for generating data filters in accordance with user input; and a data transferring module for sending a sync request including a data filter and a timestamp of the data filter to the server, and for receiving a sync response from the server. The server comprises a domain managing module for executing a data filter received from any mobile terminal, and for generating a sync response including data to be synchronized and a timestamp of execution of the data filter.

In order to achieve the second above-mentioned objective, a method for synchronizing a mobile terminal with a server in accordance with a preferred embodiment of the present invention comprises the steps of: (a) identifying a type of data to be synchronal; (b) generating a sync request in accordance with the type of data to be synchronal, and sending the sync request to the server; (c) generating a sync response based on data stored in the server, and sending the sync response to the mobile terminal; and (d) updating data stored in the mobile terminal in accordance with the sync response.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Reference will now be made to the drawings to describe the present invention in detail.

Figure 1:
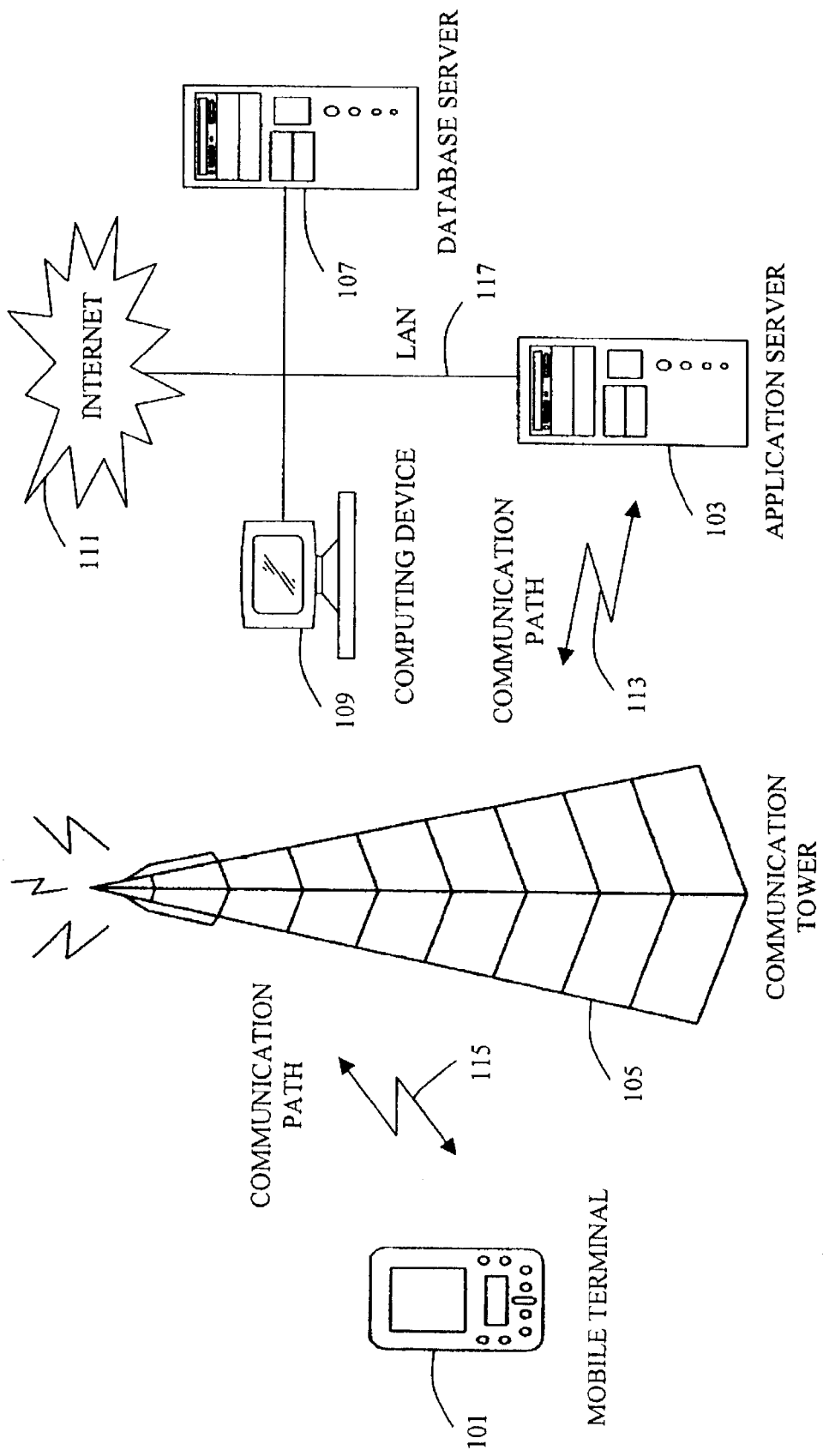
FIG. 1 is a schematic diagram of a system for synchronizing data of wireless devices in accordance with a preferred embodiment of the present invention, the system comprising an application server, a communication tower and a plurality of mobile terminals.

FIG. 1 is a schematic diagram of a system for synchronizing data of wireless devices in accordance with a preferred embodiment of the present invention. The system for synchronizing data of wireless devices comprises a three-tier information system. The three-tier information system comprises a database server 107 (the bottom tier), an application server 103 (the middle tier), and a plurality of distributed terminal workstations 101 (the top tier, only one shown). Each terminal workstation 101 of the preferred embodiment is a mobile terminal 101, which can be a Personal Digital Assistant (PDA), a pocket personal computer (PC), a laptop computer, a palmtop computer, a smart phone or a notebook computer. The application server 103 comprises core and mutable enterprise logic of the system for synchronizing data of wireless devices. Such logic includes rules for execution and management of the system. The application server 103 processes input of users, and returns results of processing to users. The database server 107 controls processing of data stored in a system database located in the database server 107. Such processing includes reading, writing, deleting, modifying, and backup.

A communication tower 105 is connected to the application server 103 via either a private or a public communication path 113. The communication path 113 may or may not be wireless. The communication tower 105 is connected to the mobile terminal 101 via either a private or a public communication path 115. The communication path 115 may or may not be wireless. The application server 103 is coupled to a local area network (LAN) 117, which is attached to a computing device 109 and the database server 107. The LAN 117 provides access to the Internet 111 for the application server 103 and the computing device 109. The mobile terminal 101 therefore also has access to the database server 107 and the Internet 111 via the LAN 117, the application server 103, the communication path 113, and the communication path 115.

The system described is provided by way of example only. Many variations of the system described, and even different types of systems, can also employ the disclosed method of the present invention. It should also be apparent to one skilled in the art that the disclosed method can be advantageously deployed within almost any communication or other type of system in which either bandwidth and/or device memory is an issue. The claimed subject matter is not limited to systems that employ wireless communication links. Nevertheless, this is one area in which the advantages of the claimed subject matter are readily apparent.

Figure 2:
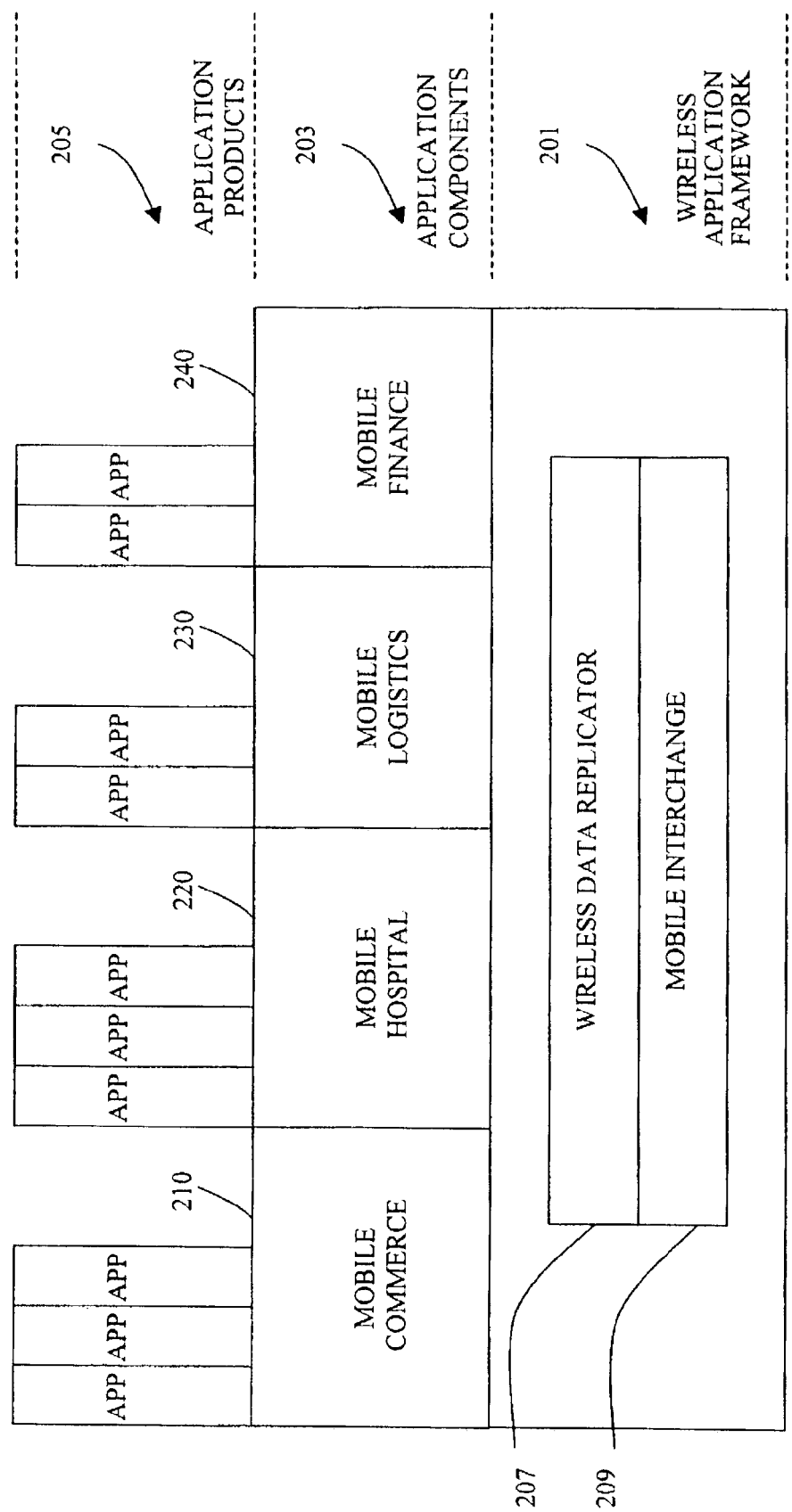
FIG. 2 is a block diagram of architecture of an exemplary wireless application of the present invention, including libraries that execute on the mobile terminals and the application server.

FIG. 2 is a block diagram of architecture of an exemplary wireless application of the present invention, including libraries that execute on the mobile terminals 101 and the application server 107. A wireless application framework 201 includes a wireless data replicator 207 and a mobile interchange 209. The wireless application framework 201 provides services to facilitate development of wireless applications for the mobile terminal 101. The wireless application framework 201 is standard based and flexible so as to be device, operating system and database independent.

The mobile interchange 209 provides real-time access to the application server 103 for the mobile terminal 101. In the preferred embodiment, the mobile interchange 209 is based upon extensible markup language (XML) and hypertext transfer protocol (HTTP). XML allows designers to define, transmit, validate, and interpret data between applications and between organizations. HTTP is the underlying protocol used for the Internet that defines how messages are formatted and transmitted, and what actions a web server or browser should take in response to a particular command. Both XML and HTTP use a remote procedure call (RPC) paradigm, a popular paradigm for implementing inter-process communication (IPC) between separate processes in different computers across a network. Of course, RPC and IPC can also be implemented within a single computing device. The disclosed wireless application framework 201 provides a compact and efficient environment for developing client/server applications that operate in a wireless architecture.

A client library of the wireless application framework 201 provides the following functionality for an associated client application:
(1) generating the contents (method names and parameters) of an RPC;
(2) forming an XML message;
(3) sending the XML message using the HTTP protocol to the application server 103; and
(4) receiving and interpreting a corresponding response from the application server 103.

A server library of the wireless application framework 201 provides the following functionality for an associated server application:
(1) receiving and interpreting a client request, specifically a request that has been generated, formed and sent by utilizing the client library, as described above;
(2) locating an appropriate procedure corresponding to the particular RPC requested in the client request;
(3) invoking the appropriate procedure; and
(4) sending the appropriate response back to the client.

The RPCs of the disclosed subject matter support the following data types in the wireless environment: integer (4 bytes); Boolean; string; date; double; base-64; arrays; structures; and hash tables.

The wireless data replicator 207 processes and manages data of the mobile terminals 101. The wireless data replicator 207 enables a user to select only the specific information that the user needs on his/her mobile terminal 101. By replicating only the selected data, the user saves bandwidth on the transmission medium and memory resources on his/her mobile terminal 101. The wireless data replicator 207 uses the system database that is located in the database server 107 as a client data cache. The wireless data replicator 207 provides each user of a mobile terminal 101 with customizable scripts, called "data filters," which define the data any particular user selects to store on his/her mobile terminal 101. A data filter may be defined by a particular user on his/her mobile terminal 101. Alternatively, a menu of commonly used data filters, called "standard filters", can be generated by a system administrator or system programmer. The user can simply selected from a menu of such standard filters according to the user's particular set of circumstances and responsibilities. Standard filters may also simply be templates that an individual user can select and then customize. The data filters and standard filters may each be simple, such as an equality match; or complex, such as a multiple table joined with multiple criteria.

The wireless data replicator 207 and the mobile interchange 209 provide a platform on which specialized applications can be built. In the present example, the specialized applications include a mobile commerce application 210, a mobile hospital application 220, a mobile logistics application 230 and a mobile finance application 240. The particular applications 210, 220, 230, 240 are each an application component 203 of the system for synchronizing data of wireless devices, and provided herein only by way of examples. In actuality, the method of the present invention as disclosed by way of the preferred embodiment may be employed to implement any application that can benefit from mobile access to a central application server or central database server. The applications 210, 220, 230, 240 each comprise a variety of application products 205 of the system for synchronizing data of wireless devices.

Figure 3:
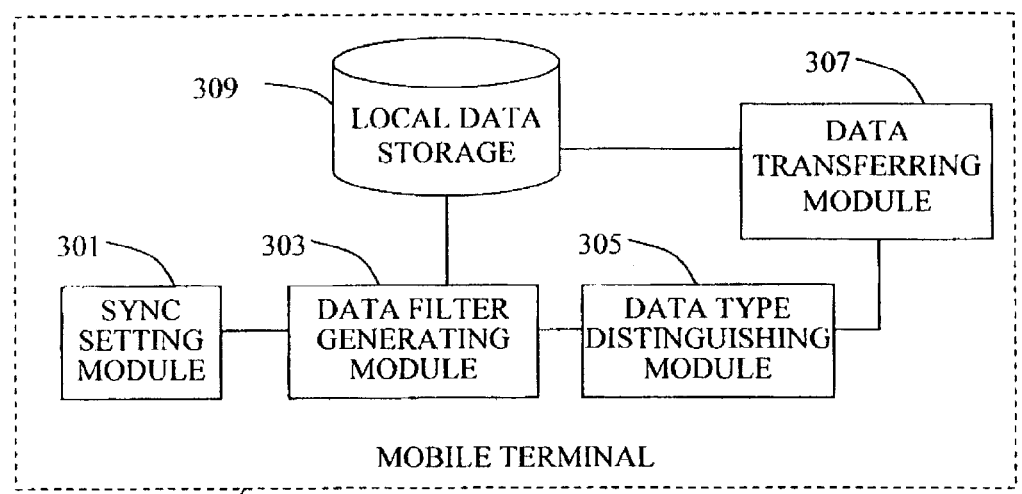
FIG. 3 is a schematic block diagram of function modules of one mobile terminal of the system of FIG. 1.

FIG. 3 is a schematic block diagram of function modules of one mobile terminal 101 of the system for synchronizing data of wireless devices. The mobile terminal 101 comprises a sync setting module 301, a data filter generating module 303, a data type distinguishing module 305, a data transferring module 307, and a local data storage 309. The sync setting module 301 provides a graphical user interface (GUI) for a user to input sync needs. The data filter generating module 303 generates a data filter in accordance with the user's input. The generated data filter can be executed in the application server 103 so as to generate a sync response. The generated data filter is stored in the local data storage 309.

Data stored in the local data storage 309 is classified into read-only data and read-and-write data, according to whether or not the mobile terminal 101 can modify the data. To reduce communication traffic between the mobile terminal 101 and the application server 103, there are two types of syncs corresponding to the type of data to be synchronal: fast sync and normal sync. Fast sync is used in synchronizing read-only data, and normal sync is used in synchronizing read-and-write data. These two types of synchronizing are described in detail below. The data type distinguishing module 305 is used for distinguishing the type of data to be synchronal.

The data transferring module 307 handles messages to and from the application server 103 via the communication tower 105.

Figure 4:
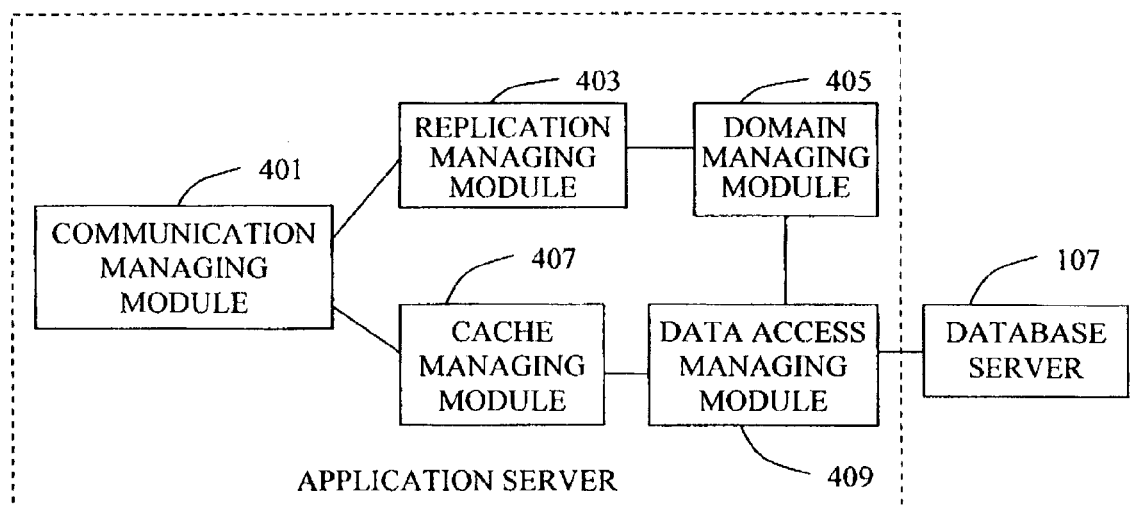
FIG. 4 is a schematic block diagram of function modules of the application server of the system of FIG. 1.

FIG. 4 is a schematic block diagram of function modules of the application server 103 of the system for synchronizing data of wireless devices. The application server 103 comprises a communication managing module 401, a replication managing module 403, a domain managing module 405, a cache managing module 407, and a data access managing module 409. The communication managing module 401 handles messages to and from the mobile terminal 101. The communication managing module 401 maintains a transmission control protocol (TCP) connection from the application server 103 to the mobile terminal 101. On the application server 103 side of the connection, the communication managing module 401 receives RPC calls in the form of byte streams from the mobile terminal 101. The communication managing module 401 parses an RPC byte stream, converts the stream parameters into a data structure, and invokes an appropriate local procedure using the data structure. Results generated by the RPC are then stored in output parameters of the data structure.

The replication managing module 403 and the cache managing module 407 are respectively coupled to the communication managing module 401. The replication managing module 403 handles bi-directional data synchronization matters between the mobile terminal 101 and the application server 103. In addition, the replication managing module 403 provides end-to-end transmission transaction control that detects and resolves data conflicts among different mobile terminals 101.

The domain managing module 405 is coupled to the replication managing module 403. Data is organized into domains in order to make the storage, collection and dissemination of the data less dependent upon the particular server process that a particular system may employ, such as a Database Management System (DBMS). A particular domain contains the definition of a particular object, including the individual data elements, or "attributes," that make up the object. Each attribute has a data type and one or more values. For example, an "account" object may include attributes related to a bank account such as the owner's name and the balance. On the application server 103, an object is also the logical representation of related pieces of data. Each object has a unique identifier, or a unique key. When a particular object is updated, all the data relating to that object is also updated automatically. Applications such as the mobile commerce application 210, the mobile hospital application 220, the mobile logistic application 230 and the mobile finance application 240 each have collections of domains that are specific to the particular application. The domain managing module 405 executes a data filter, searches appropriate objects to be synchronal in a particular domain, and generates a sync response to the data filter.

Conflicts between values may be resolved based on one of four procedures. The four procedures are "Last Write," "Value Based," "Timestamp Based" and "Timestamp and Value Based," and are described in detail as follows:

(1) In the Last Write procedure, the last value written to the database becomes the value of an object. This method is appropriate in situations where it is highly unlikely that multiple users will want to update the same sets of data. One problem with this procedure is that it is possible for an earlier change to overwrite a later change if the earlier change is performed off-line and not replicated until after the later change.

(2) In the Value Based procedure, the application server 103 accepts a change if the 'old value' in the mobile terminal 101 matches the current value on the application server 103.

(3) In the Timestamp Based procedure, if a timestamp of a change provided by the mobile terminal 101 is greater (later) than a current timestamp of the object on the application server 103, the change is accepted. This procedure assumes that clocks on the mobile terminal 101 and the application server 103 are relatively well synchronized.

(4) In the Timestamp and Value Based procedure, a timestamp of a change provided by the mobile terminal 101 must be later than a current timestamp of the object on the application server 103. Additionally, the value provided as the 'old value' by the mobile terminal 101 must match the current value on the application server 103. These conditions ensure that the change is recent, and that the user of the mobile terminal 101 was aware of the representation of the object in the application server 103 when making the change.

Changes to data that are not resolved by the replication managing module 403 of the application server 103 and thus not accepted are stored for review by a system administrator. The system administrator can decide on a case-by-case basis whether or not a particular change should be accepted.

The cache managing module 407 provides a cache of data objects previously extracted from the system database, in order to make duplicate data requests from the mobile terminal 101 more efficient. The purpose and function of a cache are well known to those skilled in the computing field. The data access managing module 409 controls access to the database server 107.

Figure 5:
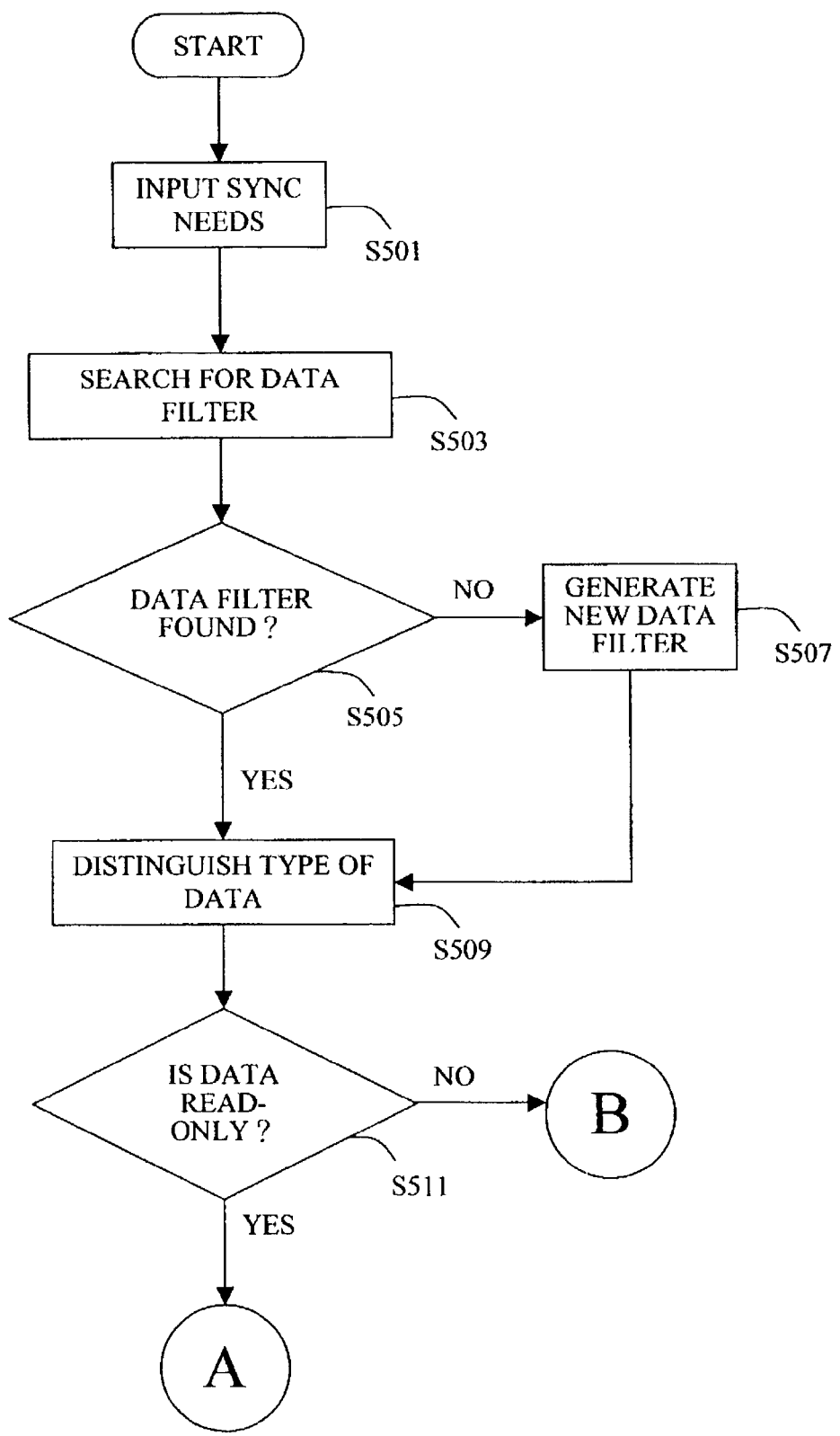
FIG. 5 is a flowchart of sending a sync request in accordance with a preferred embodiment of the present invention.

FIG. 5 is a flowchart of sending a sync request in accordance with a preferred embodiment of the present invention. Firstly, in step S501, a user inputs sync needs into his/her mobile terminal 101 via the sync setting module 301 thereof. In step S503, the data filter generating module 303 searches for a matching data filter in the local data storage 309. In step S505, the data filter generating module 303 determines whether a matching data filter is found. If a matching data filter is found, then the procedure proceeds directly to step S509 described below. If a matching data filter is not found, then in step S507, the data filter generating module 303 generates a new data filter to synchronize data the user needs synchronized, whereupon the procedure proceeds to step S509. In step S509, the data type distinguishing module 305 distinguishes the type of data to be synchronal. In step S511, the data type distinguishing module 305 determines whether the type of data to be synchronal is read-only for the mobile terminal 101. If the type of data to be synchronal is read-only, then fast sync is used. The procedure for fast sync is described in detail below with reference to FIG. 6. If the type of data to be synchronal is read-and-write for the mobile terminal 101, then normal sync is used. The procedure for normal sync is described in detail below with reference to FIG. 7.

Figure 6:
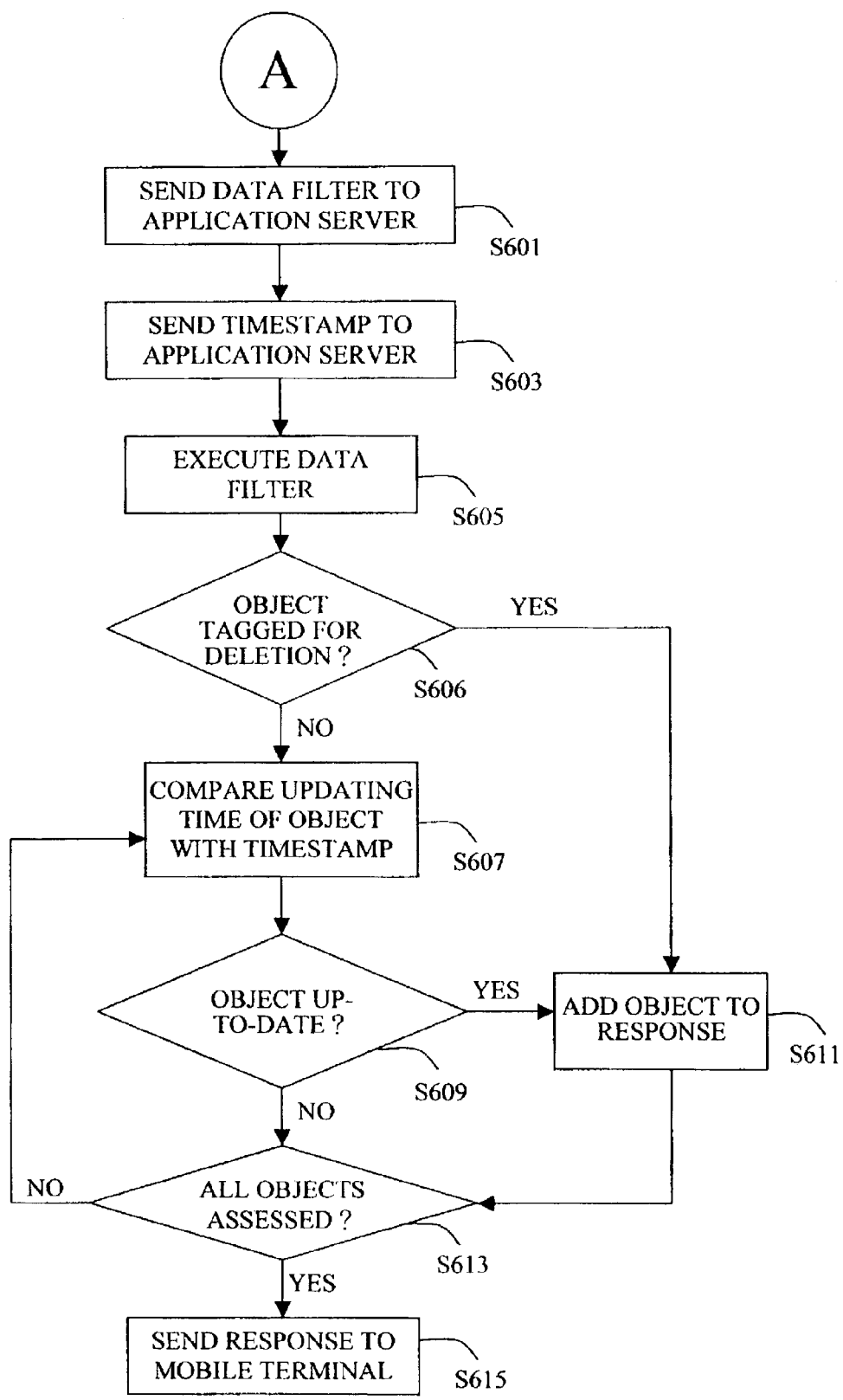
FIG. 6 is a flowchart of fast sync in accordance with the preferred embodiment of the present invention.

FIG. 6 is a flowchart of fast sync in accordance with the preferred embodiment of the present invention. In fast sync, two stages of deleting are adopted for data which are read-only for the mobile terminal 101 and which are stored in the application server 103. When the data are deleted a first time in the mobile terminal 101, the data are tagged for deletion in the application server 103. Thereafter, the data are deleted from all other mobile terminals 101 at the respective times such mobile terminals 101 respectively perform syncs, after which the data are deleted from the application server 103.

In step S601, the data transferring module 307 sends the data filter to the application server 103 via the communication tower 105. In step S603, the data transferring module 307 sends a timestamp of the data filter to the application server 103. The timestamp indicates the latest time the data filter is executed, and is stored in the local data storage 309. If the data filter is newly generated, it has no corresponding timestamp. The communication managing module 401 receives data from all mobile terminals 101 via the communication tower 105, and sends the data to the replication managing module 403. The replication managing module 403 provides end-to-end transmission transaction control that detects and resolves data conflicts among different mobile terminals 101. The replication managing module 403 sends the data filter and the timestamp of the data filter to the domain managing module 405.

In step S605, the domain managing module 405 executes the data filter, searches for objects that match the data filter in a corresponding domain, and generates a draft sync response. In step S606, the domain managing module 405 determines whether any matching objects found are already tagged for deletion. A matching object found may already be tagged for deletion as a result of a sync that has previously been performed by another mobile terminal 101. If any matching objects are tagged for deletion, then in step S611, the domain managing module 405 adds those matching objects to the sync response, whereupon the procedure proceeds to step S613 described below. If one or more matching objects are not tagged for deletion, then in step S607, the domain managing module 405 compares a most recent updating time of a matching object with the timestamp of the data filter. In step S609, the domain managing module 405 determines whether the matching object is up-to-date. If the timestamp of the data filter is earlier than the updating time of the matching object, this indicates that the corresponding object stored in the mobile terminal 101 needs to be updated. Accordingly, in step S611, the matching object is added to the sync response, whereupon the procedure proceeds to step S613 described below. If the timestamp of the data filter is not earlier than the updating time of the matching object, then the procedure proceeds to step S613. In step S613, the domain managing module 405 determines whether all matching objects in the application server 103 have been assessed by the domain managing module 405. If all matching objects have not been assessed, then the procedure returns to step S607 for assessment of another matching object. If all matching objects have been assessed, then in step S615, the domain managing module 405 adds a time of execution of the data filter to the sync response for the mobile terminal 101 to update the timestamp of the data filter, and the application server 103 sends the sync response to the mobile terminal 101 via the communication tower 105.

Figure 7:
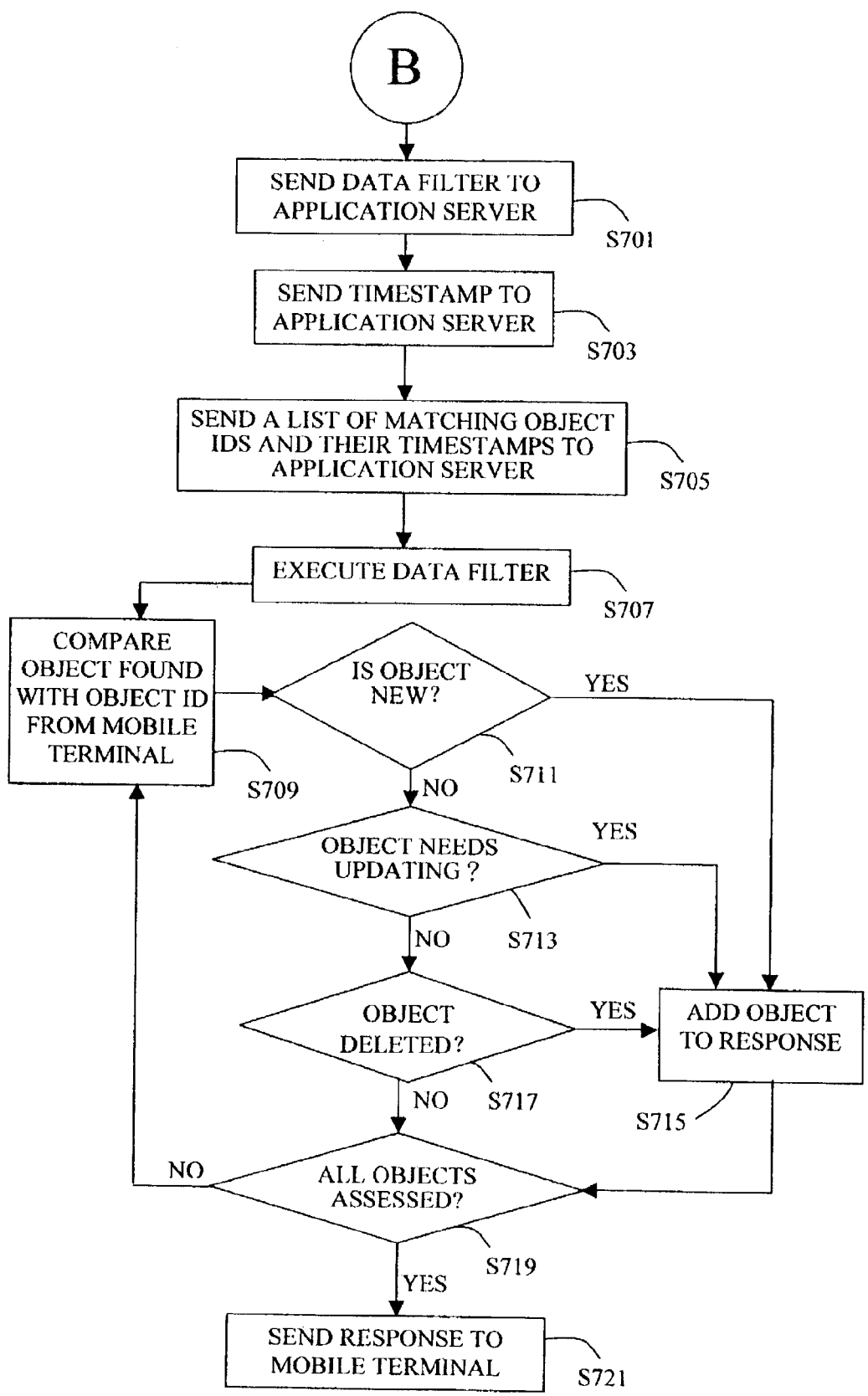
FIG. 7 is a flowchart of normal sync in accordance with the preferred embodiment of the present invention.

FIG. 7 is a flowchart of normal sync in accordance with the preferred embodiment of the present invention. Firstly, in step S701, the data transferring module 307 sends the data filter to the application server 103 via the communication tower 105. In step S703, the data transferring module 307 sends a timestamp of the data filter to the application server 103. The mobile terminal 101 searches for objects that match the data filter in the local data storage 309. In step S705, the data transferring module 307 sends a list of object IDs that match the data filter to the application server 103, the list showing respective timestamps of the object IDs.

Then in step S707, the domain managing module 405 of the application server 103 executes the data filter, and searches for objects that match the data filter in a corresponding domain. In step S709, the domain managing module 405 compares a matching object found in the application server 103 with the corresponding object's ID received from the mobile terminal 101, and generates a draft sync response. In step S711, the domain managing module 405 determines whether the matching object in the application server 103 is a new object. If the matching object in the application server 103 does not exist in the list of object IDs received from the mobile terminal 101, this indicates that the matching object is a new object. Accordingly, in step S715, the matching object is added to the sync response, whereupon the procedure proceeds directly to step S719 described below. Otherwise, in step S713, the domain managing module 405 determines whether the matching object has been updated since the most recent sync of the object. If the most recent updating time of the matching object is later than the timestamp of the corresponding object stored in the local data storage 309 of the mobile terminal 101, this indicates that the object stored in the mobile terminal 101 needs to be updated, and the procedure proceeds directly to step S715 described above. Otherwise, in step S717, the domain managing module 405 determines whether the matching object has been deleted in the application server 103. If the matching object is not found in the application server 103, this indicates that the object should be deleted from the mobile terminal 101. Accordingly, in step S715, a prompt is added in the sync response to remind the mobile terminal 101 to delete the object stored in the local data storage 309 of the mobile terminal 101, whereupon the procedure proceeds directly to step S719 described below. If the matching object has not been deleted in the application server 103, then the procedure proceeds to step S719. In step S719, the domain managing module 405 determines whether all matching objects found both in the application server 103 and in the mobile terminal 101 have been assessed. If all objects found have not been assessed, then the process returns to step S709. If all objects found have been assessed, then in step S721, the domain managing module 405 adds a time of execution of the data filter to the sync response for the mobile terminal 101 to update the timestamp of the data filter, and the application server 103 sends the sync response to the mobile terminal 101 via the communication tower 105.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. A system for synchronizing a local data storage of a mobile terminal with a remote data storage of a server, the system comprising a server and at least one mobile terminal, wherein:
   the at least one mobile terminal comprises:
      a data type distinguishing module;
      a data filter generating module for generating data filters in accordance with selected data to be synchronized; and
      a data transferring module for defining a fast sync request and a normal sync request according to the type of data, for sending the fast sync request or the normal sync request including a data filter to the server, and for receiving a sync response from the server; and
   the server comprises a domain managing module for executing the data filter received from the at least one mobile terminal, and for generating a sync response including data to be synchronized and a timestamp of the data filter.

2. The system as claimed in claim 1, wherein the system further comprises a communication tower.

3. The system as claimed in claim 1, wherein the data to be synchronized includes read-only data and read-and-write data.

4. The system as claimed in claim 1, wherein the timestamp of the data filter is updated in accordance with the sync response.

5. A method for synchronizing a local data storage of a mobile terminal with a remote data storage of a server, the method comprising the steps of:
   specifying data to be synchronized;
   searching for a data filter in a local data storage in accordance with the specified data;
   generating a data filter in accordance with the specified data if no relevant data filter is found in the local data storage;
   distinguishing a type of the data to be synchronized in accordance with the data filter;
   using fast sync if the data are read-only; otherwise, using normal sync;
   sending a sync request to the server;
   generating a sync response;
   sending the sync response to the mobile terminal; and
   updating data stored in the local data storage in accordance with the sync response.

6. The method as claimed in claim 5, wherein the sync request includes the data filter, and a timestamp of the data filter if fast sync is used.

7. The method as claimed in claim 5, wherein the sync request includes the data filter, a timestamp of the data filter, and a list of object IDs and corresponding timestamps if normal sync is used.

8. The method as claimed in claim 5, wherein if fast sync is used, the step of generating a sync response further comprises the steps of:
   executing the data filter received from the mobile terminal, searching for relevant objects in the storage of the server, and generating a sync response;
   comparing an updating time of a relevant object found with a timestamp of the data filter, and adding the relevant object to the sync response if the timestamp of the data filter is earlier than the updating time of the relevant object found; and
   adding a time of execution of the data filter to the sync response.

9. The method as claimed in claim 5, wherein if normal sync is used, the step of generating a sync response further comprises the steps of:
   executing the data filter received from the mobile terminal, searching for relevant objects in the storage of the server, and generating a sync response;
   comparing an updating time of a relevant object found with an updating time of the corresponding object stored in the mobile terminal, and adding the relevant object found to the sync response if the updating time of the relevant object found is later than the updating time of the corresponding object stored in the mobile terminal; and
   adding a time of execution of the data filter to the sync response.

10. A method for synchronizing data of a mobile terminal with data of a server, the method comprising the steps of:
    identifying a type of data to be synchronal;
    generating a sync request in accordanve with the type of data to be synchronal, and sending the sync request to the server;
    generating a sync response based on data stored in the server, and sending the sync response to the mobile terminal; and
    updating data stored in the mobile terminal in accordance with the sync response;
    wherein the sync request is a fast sync request or a normal sync request.

11. The method as claimed in claim 10, wherein the data is stored in a local data storage of the mobile terminal.

12. The method as claimed in claim 10, wherein the data is stored in a remote data storage of the server.

13. The method as claimed in claim 10, wherein the type of the data to be synchronal is read-only data or read-and-write data.

14. The method as claimed in claim 10, further comprising the step of specifying data to be synchronal.

15. A method of synchronizing a local data storage of a mobile terminal with a remote data storage of a server via an application server in two sync states, comprising steps of:
    specifying data to be synchronized;
    retrieving a data filter in a local data storage in accordance with the specified data;
    distinguishing a type of the data to be synchronized in accordance with the data filter; and
    defining fast sync and normal sync according to the type of the data;

wherein
under fast sync the application server only updates matching objects with regard to the data; while under normal sync, the application server not only updates matching objects with regard to the data, but also compares said matching objects found with object identifications provided by the mobile terminal before updating said matching objects so as to be able to completely update the corresponding matching objects with regard to the data stored in the mobile terminal.

* * * * *